(12) United States Patent
Dommnik et al.

(10) Patent No.: US 12,259,020 B2
(45) Date of Patent: Mar. 25, 2025

(54) DIVIDING BAR FOR INTERNAL DIVISION OF AN ENERGY GUIDE CHAIN

(71) Applicant: IGUS GMBH, Cologne (DE)

(72) Inventors: Joerg Dommnik, Neunkirchen-Seelscheid (DE); Andreas Hermey, Hennef (DE)

(73) Assignee: IGUS GMBH, Cologne (DE)

( * ) Notice: Subject to any disclaimer, the term of this patent is extended or adjusted under 35 U.S.C. 154(b) by 0 days.

(21) Appl. No.: 18/044,022

(22) PCT Filed: Aug. 31, 2021

(86) PCT No.: PCT/EP2021/074062
§ 371 (c)(1),
(2) Date: Mar. 3, 2023

(87) PCT Pub. No.: WO2022/049091
PCT Pub. Date: Mar. 10, 2022

(65) Prior Publication Data
US 2023/0375073 A1    Nov. 23, 2023

(30) Foreign Application Priority Data

Sep. 4, 2020  (DE) ...................... 20 2020 105 121.0

(51) Int. Cl.
*F16G 13/16*   (2006.01)
*F16L 3/01*    (2006.01)
*H02G 3/02*    (2006.01)

(52) U.S. Cl.
CPC ............... *F16G 13/16* (2013.01); *F16L 3/01* (2013.01); *H02G 3/02* (2013.01)

(58) Field of Classification Search
CPC .. F16G 13/16; F16L 3/01; H02G 3/02; H02G 11/006; H02G 11/02; H02G 3/0475;
(Continued)

(56) References Cited

U.S. PATENT DOCUMENTS

| 3,921,388 A | * | 11/1975 | Loos | ....................... F16G 13/16 |
| | | | | 248/51 |
| RE32,941 E | * | 6/1989 | Newton | .................. F16G 13/02 |
| | | | | 474/208 |

(Continued)

FOREIGN PATENT DOCUMENTS

| DE | 9102121 | 5/1991 |
| DE | 4313242 | 11/1994 |

(Continued)

OTHER PUBLICATIONS

International Search Report from corresponding PCT Appln. No. PCT/EP2021/074062, dated Dec. 23, 2021.
(Continued)

*Primary Examiner* — Muhammad Ijaz
(74) *Attorney, Agent, or Firm* — Grossman, Tucker, Perreault & Pfleger, PLLC

(57) ABSTRACT

A dividing bar for an energy guide chain including a plate-like main body having two main sides and two narrow sides extending in a heightwise direction between two end regions. At least one of the end regions is adapted for releasable fixing to a transverse bar. A respective number of holding grooves for holding plate-like shelves is provided at main sides. According to the invention each holding groove is respectively of a continuous configuration from the one narrow side to the other and at each narrow side has an insertion opening through which a shelf can be respectively introduced into and removed again from the respective holding grooves respectively in both opposite assembly directions. The dividing bar further includes a securing device for securing fitted shelves against unwanted displacement in both assembly directions and against unwanted release from the respective holding groove.

17 Claims, 6 Drawing Sheets

(58) Field of Classification Search
CPC ............. A61G 13/107; A61G 12/002; B65H 75/4463; B65H 75/4402; B65H 75/42; B65H 2701/3914; B65H 2701/34
USPC ................. 248/560, 544, 49, 51; 59/78.1
See application file for complete search history.

(56) References Cited

U.S. PATENT DOCUMENTS

| | | | |
|---|---|---|---|
| 4,962,639 A | 10/1990 | Blase | |
| 5,048,283 A * | 9/1991 | Moritz | F16G 13/16 59/900 |
| 5,174,104 A * | 12/1992 | Wehler | H02G 11/006 59/900 |
| 8,549,831 B2 * | 10/2013 | Dunham | H02G 11/006 248/51 |
| 8,674,263 B2 * | 3/2014 | Gelmetti | B23K 9/133 242/615.3 |
| 8,727,084 B1 * | 5/2014 | Kuker | B65H 75/425 242/378.2 |
| 8,763,787 B2 * | 7/2014 | Manning | B65G 21/18 198/835 |
| 8,882,052 B2 * | 11/2014 | Komiya | F16G 13/20 248/62 |
| 8,894,021 B1 * | 11/2014 | Daniel | H02G 3/083 166/77.51 |
| 9,057,420 B1 * | 6/2015 | Hsieh | F16L 3/015 |
| 9,346,653 B1 * | 5/2016 | Jawidzik | B65H 75/4449 |
| 9,695,910 B2 * | 7/2017 | Komiya | F16G 13/18 |
| 9,821,979 B2 * | 11/2017 | Schwartz | B65H 51/04 |
| 2006/0219421 A1 | 10/2006 | Kitagawa | |
| 2014/0345245 A1 * | 11/2014 | Borch-Jensen | F16G 13/16 59/78.1 |
| 2015/0001327 A1 * | 1/2015 | Hamada | B65H 75/48 242/376 |
| 2015/0060609 A1 * | 3/2015 | Scholer | H02G 3/0475 59/85 |
| 2015/0086274 A1 * | 3/2015 | Schwartz | B65H 51/20 405/168.3 |
| 2015/0312667 A1 * | 10/2015 | Lei | B65H 75/406 242/379 |
| 2015/0360629 A1 * | 12/2015 | Sekino | B60R 16/037 174/68.3 |
| 2016/0031679 A1 * | 2/2016 | Christmas | B66C 1/125 59/30 |
| 2016/0053854 A1 * | 2/2016 | Hermey | F16G 13/16 59/78.1 |
| 2016/0149384 A1 * | 5/2016 | Lu | F16L 3/015 59/78.1 |
| 2016/0290438 A1 * | 10/2016 | Komiya | F16G 13/18 |
| 2016/0348757 A1 * | 12/2016 | Jaeker | G01L 5/106 |
| 2017/0023102 A1 * | 1/2017 | Tetsuka | H02G 3/0475 |
| 2017/0165877 A1 * | 6/2017 | Hanson | H02G 3/0475 |
| 2017/0207612 A1 * | 7/2017 | Handler | H02G 9/025 |
| 2017/0222419 A1 * | 8/2017 | Oginski | B65H 75/4463 |
| 2018/0109091 A1 * | 4/2018 | Strack | F16G 13/16 |

FOREIGN PATENT DOCUMENTS

| | | |
|---|---|---|
| DE | 29907443 | 7/1999 |
| DE | 102006014598 | 10/2006 |
| DE | 102009030798 | 4/2010 |
| DE | 102016012144 | 4/2018 |
| EP | 0343192 | 12/1990 |

OTHER PUBLICATIONS

International Preliminary Report on Patentability from corresponding PCT Appln. No. PCT/EP2021/074062, dated Mar. 16, 2023.

* cited by examiner

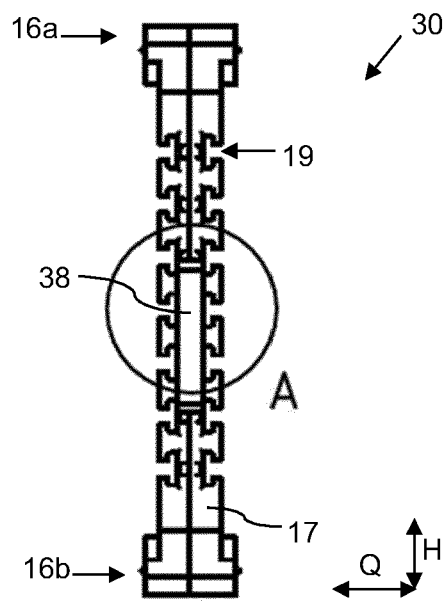
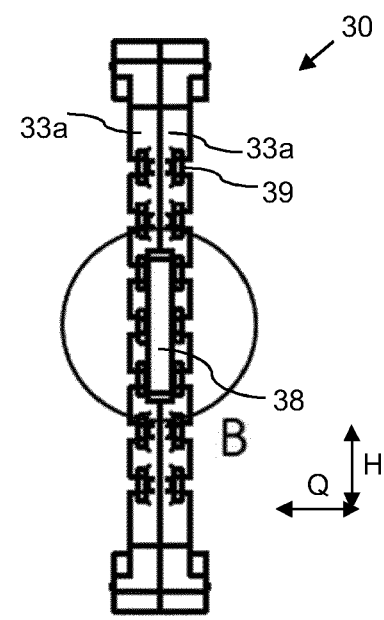
FIG.5A
FIG.5B
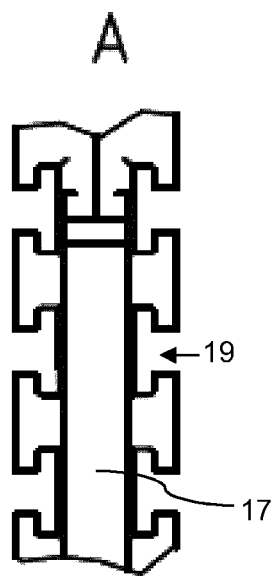
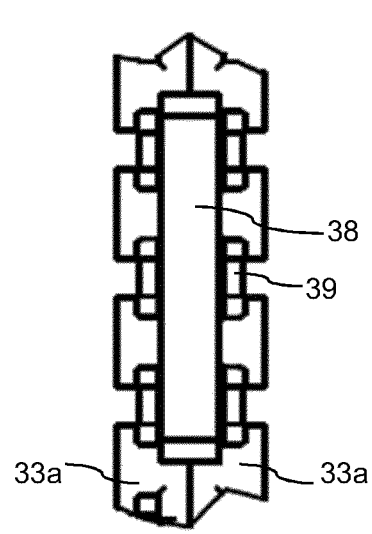
FIG.6A
FIG.6B

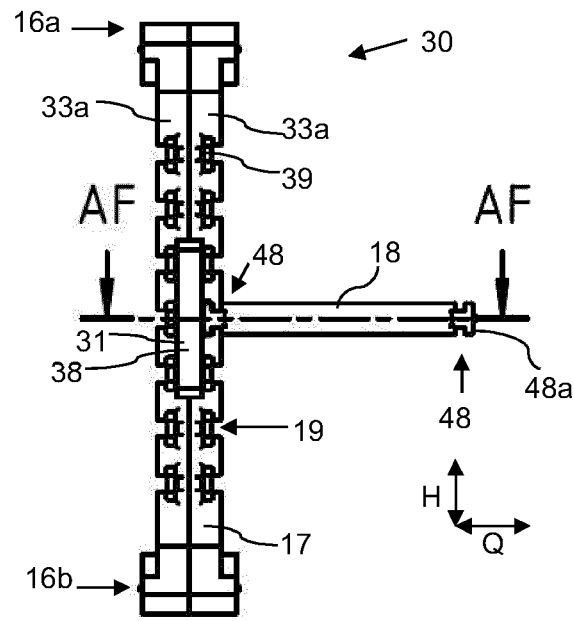
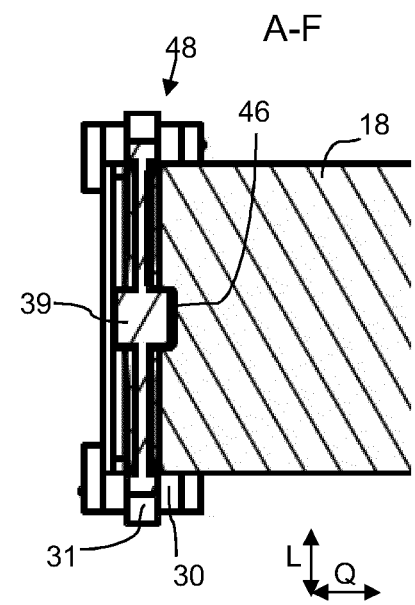
FIG.7A                FIG.7B
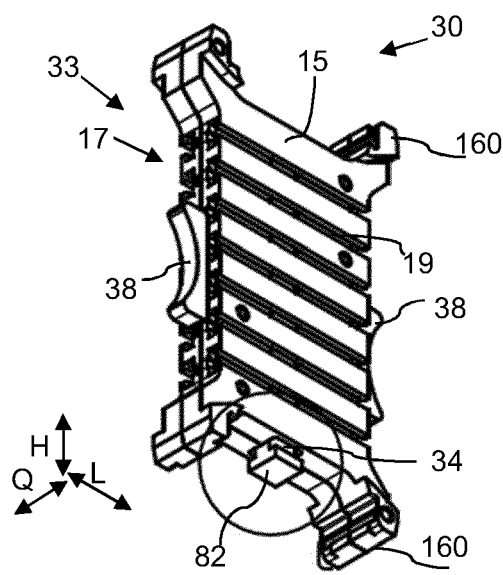
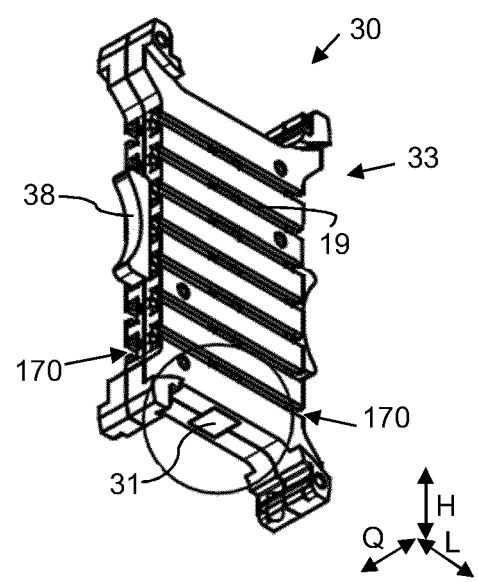
FIG.8A                FIG.8B

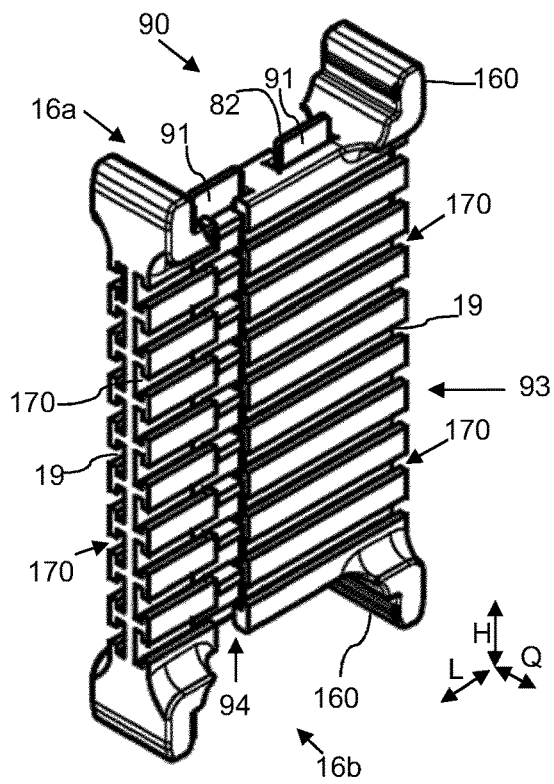
FIG.9A
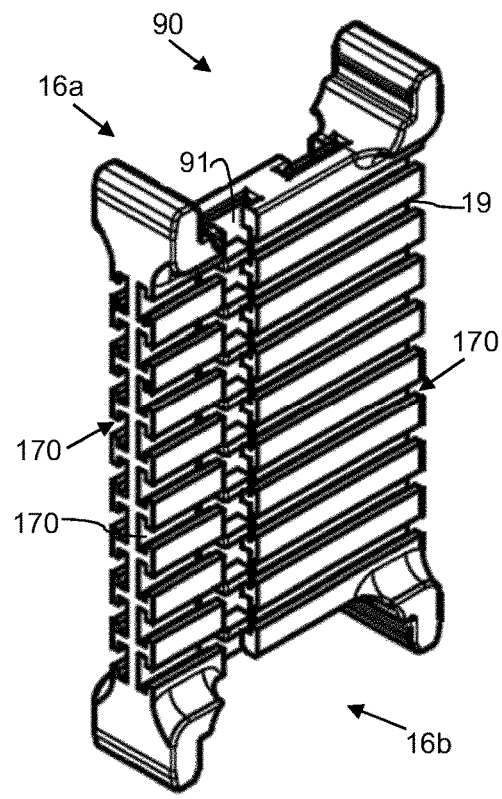
FIG.9B
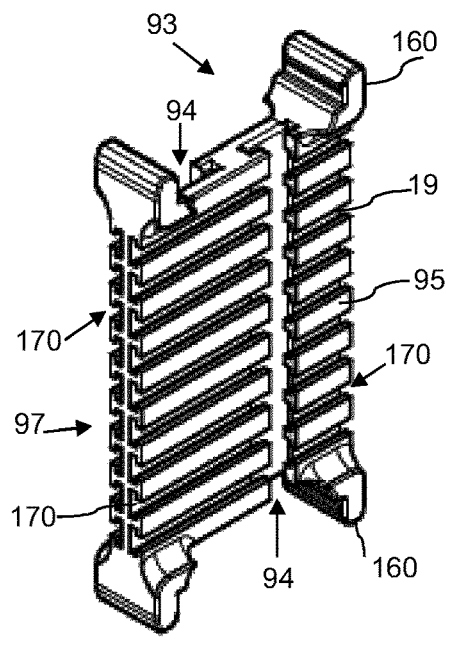
FIG.10A
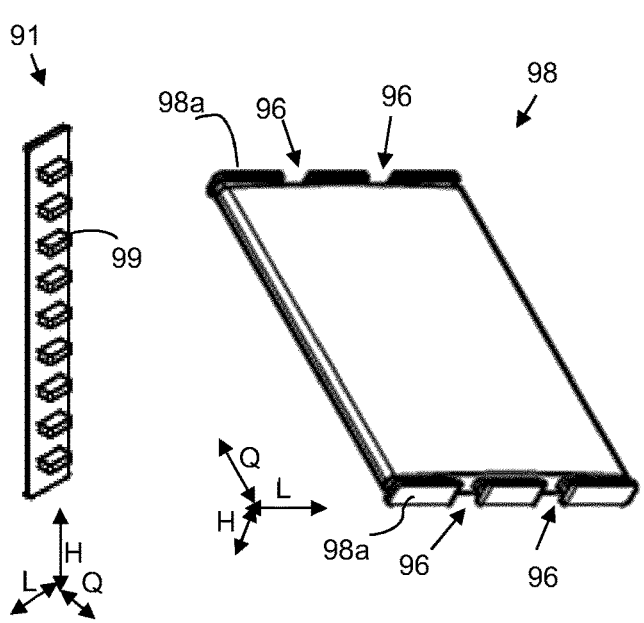
FIG.10B   FIG.10C

DIVIDING BAR FOR INTERNAL DIVISION OF AN ENERGY GUIDE CHAIN

FIELD

The invention generally concerns the field of energy guide chains for guiding lines like for example cables or hoses. Energy guide chains typically serve to guide supply lines for power, data or media between a connection and a connection which is moveable relative thereto at a moveable consumer. They typically include a multiplicity of pivotably interconnected chain links.

The invention concerns in particular a so-called dividing bar or separating bar for a chain link of an energy guide chain.

At least one part of the chain links is respectively made up of two laterally outwardly arranged side plates or side portions and at least one transverse bar, occasionally also referred to as a transverse member, which holds the side plates parallel. The transverse bar or bars can be connected fixedly or releasably (the so-called opening bar) to the side plates. Considered in cross-section perpendicularly to the longitudinal direction of the energy guide chain the side plates and transverse bars define a receiving space in the chain link. The chain links therefore jointly form a guide passage which is continuous in the longitudinal direction and in which the lines are received.

BACKGROUND

In applications having a large number of guided lines it is advantageous for the receiving space or the guide passage to be subdivided into separate regions, that is to say to provide for so-called internal division of the energy guide chain. In that way inter alia friction between the lines, due to different radii of curvature or a relative movement in the direction-changing arc, can be reduced or avoided. Basically lines involving greatly different diameters should be guided separating from each other. Internal division of the energy guide chain also allows a long-lasting arrangement for the distribution of weight in the case of lines of differing weight.

The internal division avoids inter alia unwanted movements of the lines, for example rotational movements (so-called "corkscrews" and the like) in the guide passage or displacement of lines one over the other, which for example can result in hoses being squashed by heavy electric lines.

Separating bars or dividing bars are provided for vertical subdivision, that is to say for dividing up the width of the receiving space. They extend substantially parallel to the side plates and are generally mounted to the transverse bars. Separating bars for links of an energy guide chain are described for example in German Utility Model DE 299 07 443 U1 or German patent application DE 43 13 242 A1 to the present applicant.

Horizontal division, that is to say for subdividing the usable height of the receiving space, is effected by the provision of so-called compartment shelves (also referred to as support shelves, insert shelves or the like) similarly to rungs. They can serve as a support for the lines. They extend parallel to the transverse bars, that is to say substantially perpendicularly to the side plates, and are usually mounted to dividing bars or separating bars. Compartment shelves are described in patent EP 0 343 192 B1.

The term dividing bars is used here to denote special separating bars which at least at one side and preferably at both sides, have a plurality of holders for shelves or means for fitting shelves. Dividing bars therefore inherently afford various possible options for selectively fitting shelves in the internal space.

A tried-and-tested structure for dividing bars, which allows finely graded heightwise division by means of shelves is also shown in EP 0 343 192 B1 to the present applicant. EP 0 343 192 B1 discloses a dividing bar having a plate-like main body with upper and lower end regions for releasable fixing to the transverse bars, two large main sides and two opposite narrow sides which extend in a heightwise direction between the end regions. Provided at both main sides are a respective number of holding grooves extending substantially perpendicularly to the heightwise direction. A plate-like shelf with a corresponding end can be inserted into and held in each holding groove, wherein the shelf at the end forms a kind of tongue which cooperates with the holding groove in the manner of a tongue-and-groove connection.

Such dividing bars allow finely graded divisions in the heightwise direction. By virtue of smaller spacings between the holding grooves, in comparison with continuous receiving openings or apertures for shelves, a reduced modular dimension for selective positioning of the shelves is made possible.

Basically easy handlability and mountability of the components for internal division with the smallest possible amount of time and force is desirable for the mounting operation. The separate regions of the internal division of the receiving space should also be made easily accessible for maintenance purposes, for example for replacement of a line, which generally requires dismantling of shelves. Equally it is desirable to be able to easily alter the division when required, for example if subdivision is to be implemented subsequently. In previously known structures for internal division there is still a need for improvement in regard to ease of handling or user-friendliness.

SUMMARY

Taking the above-depicted state of the art as its basic starting point a first object of the present invention is to propose a structure for internal division, in particular a dividing bar which is further developed for that purpose and which simplifies handling upon assembly and maintenance or which is more user-friendly.

According to the invention in a dividing bar or separating bar it is proposed that at least some and preferably all holding grooves are respectively of a continuous structure from the one narrow side to the other and each have an insertion opening at each narrow side. Accordingly a shelf can be respectively inserted into the respective holding grooves at both sides or from both sides or in both (travel) directions of the chain through the corresponding insertion opening and thus selectively in one of two opposite assembly directions and can be removed again in that way. In addition it is provided according to the invention that the dividing bar has a securing device or a securing mechanism which secures the fitted shelf or shelves against unwanted displacement in both assembly directions and thus against unwanted release from the respective holding groove.

Accessibility for the holding grooves in both opposite directions, upon insertion and removal of the shelves, affords crucial advantages in practice and enhances user friendliness as the user no longer has to note any particular assembly or dismantling direction for the shelves. An alternate operation in both directions is also possible, which can be advantageous in relation to a plurality of shelves arranged in mutually superposed relationship. There are different possible options in regard to the securing device, in particular those which are operable with the application of a low level of force.

Insertion and removal of the shelves into and from respective holding grooves can be effected in particular by translatory insertion and withdrawal in the longitudinal direction of the energy guide chain or perpendicularly to the heightwise direction.

For that purpose the proposed dividing bar, at at least a predominant proportion of the holding grooves and preferably at each holding groove, has a first insertion opening at a narrow side, a second insertion opening at the opposite other narrow side, that is to say the holding grooves are accessible or are open at both sides. That can be provided in particular for all holding grooves at both main sides. With the two insertion openings, each holding groove opens substantially in the longitudinal direction of the energy guide chain and is thus open at both sides. A holding groove respectively holds an end of a corresponding configuration of the shelf in a direction perpendicular to the main body. The holding grooves preferably extend perpendicularly to the heightwise direction and parallel to the main plane between the two main sides of the main body. The holding grooves can be in particular in the form of recesses in the main sides, the cross-section of which perpendicularly to the main plane allows a positively locking holding action, in particular in the manner of a tongue-and-groove connection, for example with a dovetail shape or a T-shape or the like.

Depending on the respective structural height the narrow sides can form the long sides of the main sides, the end regions representing the short sides. The terminology in relation to direction of "height" and "width" refers to the receiving space and in the present case denotes directions in the cross-sectional plane perpendicularly to the longitudinal direction of the energy guide chain. In the present case horizontal means in the direction of the width of the receiving space and vertical means in the direction of the height of the receiving space, in each case irrespective of the actual spatial orientation of the chain link. The terms "up" and "down" are also not to be interpreted in an absolute sense, but in relation to an arrangement in space by way of example and are interchangeable in that respect. The terms "parallel" and "perpendicular" are to be interpreted in the present case technically and not strictly geometrically. Slight deviations from geometrical parallelism by smaller angle amounts are also deemed to be parallel.

For the avoidance of applying force for securing the shelves in force-locking relationship it is provided in a preferred embodiment that the securing device has a locking slider which is displaceable in a receiving means in the main body in the heightwise direction between a locking position and an unlocking position and has lock elements, wherein each lock element is associated with a holding groove. In that respect each lock element is displaceable into the associated holding groove for securing cooperation with the shelf, in particular with an end recess at a shelf. Preferably all required lock elements are provided on the same locking slider so that there are provided a number of lock elements corresponding to the total number of the holding grooves.

In that case each lock element preferably cooperates as a lock or blocking element with a recess on a shelf, that serves as a catch for the lock.

It is possible to provide a locking slider, for example centrally, for the holding grooves at both main sides, at each main side a locking slider for the holding grooves there, or for example also at both narrow sides for both main sides involving a respective common locking slider for locking the ends of the shelves. The securing device can therefore substantially comprise a locking slider arranged centrally in the main body. In a particularly preferred embodiment there is provided a common central locking slider for the holding grooves at both main sides. In that case the plate-like main body can include two plate portions which are preferably of identical structure or which are produced in the form of identical parts, which respectively form a number of continuous holding grooves at an outside and form a recess for the locking slider at an inside. The plate portions can be connected together by suitable connecting elements, for example they can be latched together by conjugate connecting elements or they can be fixed to each other by snap connectors and so forth.

For greater simplification of operation the locking slider can have at least one actuating projection projecting at a narrow side of the main body to allow easier operation by hand, similarly to a slider button or the like. Preferably operability at both sides is also achieved here, by the locking slider having two opposite, preferably symmetrical actuating projections which respectively project at one of the narrow sides of the main body. In that case the actuating projection can form a slider button at one side.

The locking slider is preferably in one piece with the lock elements and optionally with actuating projections.

In a further embodiment the securing device includes two locking sliders. They can be displaceable in a receiving means in the main body in the heightwise direction between a locking position and an unlocking position and can have lock elements, for example corresponding to the number of holding grooves. Here too preferably a lock element is associated with a holding groove and is displaceable therein for securing cooperation with a shelf, for example with an end recess. In this embodiment the main body can have two receiving means displaced perpendicularly relative to the heightwise direction for a respective locking slider. In that case one of the two receiving means and the locking slider mounted therein can be respectively provided at each main side.

In all embodiments with a locking slider or sliders it is advantageous if each locking slider in the unlocking position projects with an end projection at the upper or lower end region of the main body in the heightwise direction. That makes it possible to ensure by closure of the transverse bar that the locking slider is displaced into the locking position, that is to say in the closed condition of the transverse bar and the chain link the shelves are secured against unwanted release. This also prevents or blocks unwanted unlocking when the chain link is closed (with the transverse bar mounted/closed at both sides) as unlocking is only possible when the transverse bar is open. Preferably the locking slider is of such a configuration that, depending on which respective transverse bar is opened (inside radius or outside radius), it can project alternately with the end projection beyond the upper and the lower end region and is of a suitable structural height.

A suitable securing device however does not necessarily have to be in the form of a locking arrangement with a slider. In a structurally simple alternative configuration the securing device can have cooperating latching elements. It can have cooperating latching depressions and/or latching projections for example at the holding grooves and end regions of the shelves, that engage therein. In that case at least one latching depression and/or latching projection is preferably provided at each holding groove for latching cooperation with a correspondingly conjugate end latching element on the shelf. Additionally or alternatively it is also possible to consider resilient latching tongues, preferably at the ends of the shelves, as the latching elements. That can cooperate with corresponding latching edges, for example of a latching depression, at a boundary surface of the latching grooves. In particular it is possible to provide at both sides of the end region of the shelf, that engages into the latching groove, a respective resilient latching tongue or a resilient latching hook which cooperates with a respective latching edge at a boundary surface of the latching groove, for example in the manner of a barb or the like in order to lock or secure the shelf against unwanted release in the longitudinal direction, and is inoperative upon insertion.

To provide a robust positively locking holding action in the horizontal direction or perpendicularly to the main plane the holding grooves, at both main sides, are of a respective cross-section perpendicularly to the main plane of a T-shape in order to cooperate with a corresponding projection at the end of a shelf for holding the shelf. As an alternative to the T-shape cross-section it is also possible to provide a cross-section of a dovetail shape or the like.

Preferably the holding grooves extend parallel to each other and perpendicular to the heightwise direction continuously from one narrow side to the other. The holding grooves are preferably provided at each main side in respective pairs facing away from each other at the same height, but this is not necessarily the case. A so-called side portion for bearing against the side plates, that is to say with holding grooves only at one side, is deemed herein to be a dividing bar.

Preferably both end regions of the main body have a fixing device for releasable fixing by force-locking and/or positively locking connection at an upper and a lower transverse bar. In that case at least one end region and preferably both can be in the form of a latching foot for latching engagement with a transverse bar of per se known type.

Preferably the main body is of a mirror-image symmetrical configuration with respect to its heightwise central plane so that the end regions are interchangeable at top and bottom and that orientation is not an important consideration in terms of assembly.

By virtue of equivalent operability at both sides this arrangement preferably provides symmetry properties in respect of the dividing bar.

Preferably the main body is of a mirror-image symmetrical configuration with respect to its main plane, that is particularly advantageous if a common slider or lock is used at both sides on both main sides. Alternatively the main body can be of an axially symmetrical configuration with respect to its heightwise central axis, for example if a dedicated slider or lock is provided at each main side.

The invention is particularly advantageous in regard to finely graded internal division with a comparatively large number of positions for shelves, that is to say if at least five holding grooves are respectively provided at each main side, thus affording many selection options. In particular when using a locking slider, all inserted shelves in that case can be simultaneously locked and unlocked by a single actuation.

For further ease it can be provided that the two insertion openings of each holding groove respectively have opposite end inclined insertion portions or rounded insertion portions. Such inclined insertion portions or rounded insertion portions can be provided in particular at both sides and in paired relationship in a mirror-image symmetrical arrangement with respect to the longitudinal axis of the holding groove.

The invention also concerns a chain link for an energy guide chain, including two side plates and at least one transverse bar connecting the side plates together to define a receiving space for lines, wherein the chain link has two or more dividing bars according to the invention and at least one shelf respectively held at its ends by those dividing bars. The invention further concerns an energy guide chain including a multiplicity of chain links, wherein at least each second chain link has dividing bars according to the invention. Furthermore the invention concerns a construction kit for internal division of chain links for an energy guide chain, including at least two dividing bars according to the invention and at least one corresponding shelf, and finally also the use of the dividing bar according to the invention for internal division in an energy guide chain.

BRIEF DESCRIPTION OF THE DRAWINGS

Further details, features and advantages of the invention will be apparent from the detailed description hereinafter of preferred embodiments by way of example with reference to the accompanying Figures in which purely by way of example:

FIGS. 5A-5B show the dividing bar of FIG. 3 as a side view with the locking slider in the unlocking position (FIG. 5A) and in the locking position (FIG. 5B);

FIGS. 6A-6B show detail views of FIG. 5A (FIG. 6A) and FIG. 5B (FIG. 6B);

FIGS. 7A-7B show the dividing bar of FIG. 3 with the locking slider in the locking position with an inserted shelf as a front view (FIG. 7A) and a sectional view along AF (FIG. 7B);

FIGS. 8A-8B show the dividing bar of FIG. 3 with the locking slider in the unlocking position (FIG. 8A) and the locking position (FIG. 8B);

FIGS. 9A-9B show a further second embodiment of a dividing bar with two locking sliders in the unlocking position (FIG. 9A) and the locking position (FIG. 9B);

FIGS. 10A-10C show a main body of the dividing bar of FIGS. 9A-9B (FIG. 10A), a locking slider of the dividing bar of FIGS. 9A-9B (FIG. 10B) and a shelf matching the dividing bar of FIGS. 9A-9B;

DETAILED DESCRIPTION

Figure 1:
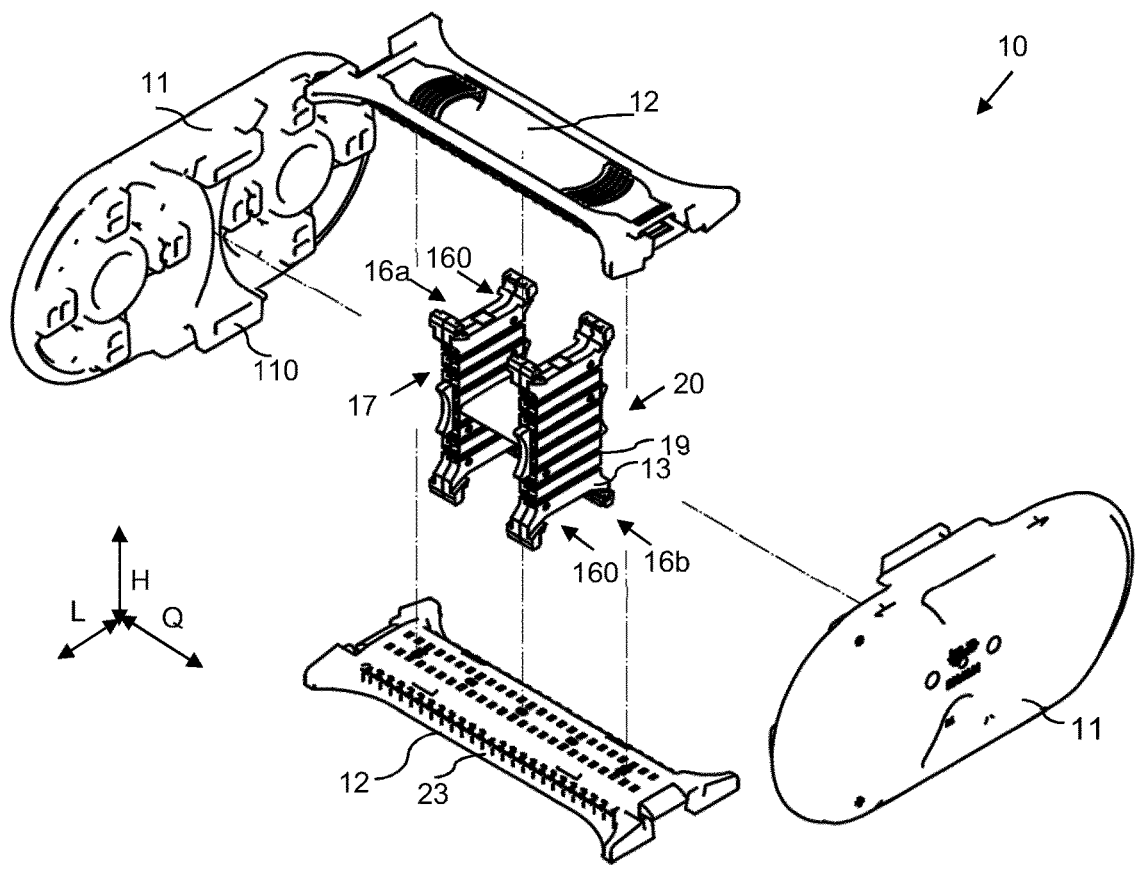
FIG. 1 shows an exploded view of a chain link of an energy guide chain according to an embodiment.
Figures 2A, 2B:
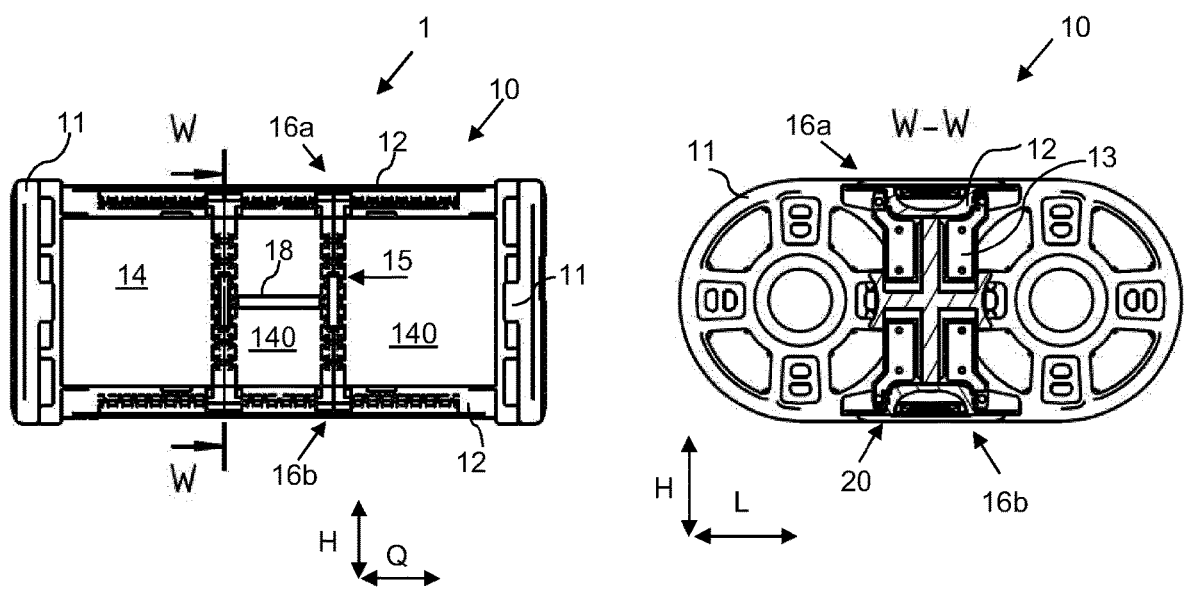
FIGS. 2A-2B show the chain link of FIG. 1 as a front view (FIG. 2A) and a sectional view (FIG. 2B)

FIG. 1 and FIG. 2A show an exploded view and a front view respectively of an internal structure by way of example of a chain link 10 of an energy guide chain 1 for actively guiding lines like for example cables and hoses (not shown). A multiplicity of chain links 10 are pivotably connected together to form an energy guide chain 1 in a longitudinal direction L perpendicularly to the plane of FIG. 2A. The longitudinal direction L corresponds to the longitudinal extent of the guided lines. The chain links 10 here consist of individual parts and have at least two side plates 11. In each chain link 10 or for example each second chain link 10 the side plates 11 are fixedly connected in a box configuration by two parallel identical transverse bars 12, as shown in FIG. 2A, and held at a spacing in the transverse direction Q of the chain link 10 perpendicularly to the longitudinal direction L and parallel to each other.

In the illustrated example the transverse bars 12 are releasable (referred to as opening bars). For that purpose the transverse bars 12 are releasably or pivotably fixed to the side plates 11 by means of end fixing regions, for example by means of clamping receiving means at horns 110 (indicated in FIG. 1) of the side plates 11. The transverse bars 12 of a chain link 10 are spaced from each other in the heightwise direction H. The heightwise direction H extends perpendicularly to the longitudinal direction L and perpendicularly to the transverse direction Q. The side plates 11 and transverse bars 12 define a receiving space 14 for the lines to be guided. Both transverse bars 12 can thus be in the form of opening bars in order to allow access to the receiving space 14 in the opened state.

The energy guide chain 1 is composed of a multiplicity of chain links 10 pivotably connected together in the longitudinal direction L. When guiding lines between two connecting locations which are moveable relative to each other the energy guide chain 1 can form an upper run, a lower run and therebetween a portion which is curved about a direction-changing axis, the direction-changing arc. The structure of an energy guide chain 1 is known per se and can be of any desired structure, for example with cranked side plates or alternate inner and outer plates constituting side plates 11. In particular two-part chain links are also considered, in which the two side plates 11 and a transverse bar 12 are made from one portion, that is to say in one piece, and only the other transverse bar 12 is releasable (not shown).

For internal division, as shown by way of example in FIG. 2A, it is known to provide vertical dividing bars 20 for dividing the receiving space 14 in the transverse direction Q and horizontal shelves 18 for dividing the receiving space 14 in the heightwise direction H.

The dividing bar 20 typically has a plate-like or flat main body 13 with a main plane which in the state of the dividing bar 12 assembled in the appropriate fashion in a chain link 10 extends in the longitudinal direction L and in the heightwise direction H parallel to the side plates 11. The shelves 18 are also of a plate-like configuration and in the state of being assembled in the appropriate fashion in the chain link 10 extend parallel to the transverse bars 12. Separating bars 20 and shelves 18 can be provided in an identical arrangement at each n-th chain link 10, in particular each second chain link 10 in order to provide the receiving space 14 for orderly arranged and better protected guidance of the lines in compartments or divisions 140 which remain the same. The illustration in FIG. 2A is here only by way of example and in simplified form, there are typically provided further dividing bars 20 and further shelves 18.

In the heightwise direction H the dividing bar 20 has two end regions 16a, 16b each having a fixing device, here a respective clip-like latching foot 160, and can be fixed at least at one of the end regions 16a, 16b to the ends 23 of the transverse bars 12 at a selectable position in the transverse direction Q or in the direction of the length of the transverse bar 12 as well as in the longitudinal direction L, for example by a latching connection. Along the ends 23 thereof the transverse bars 12 can have toothed bars, as shown in FIG. 1, for cooperating with the latching feet 160 of the dividing bars 20. The transverse bars 12 are at any event secured in the longitudinal direction L of the chain link 10 or in the direction of the width of the transverse bar 12.

The shelves 18 are to be mounted to the dividing bars 20 in selectable steps in relation to the heightwise direction H. In that respect FIGS. 1 and 2A show by way of example only one shelf 18 which divides a part of the receiving space 14 between two dividing bars 20.

The main body 13 of the dividing bar 20 further has two main sides 15 which face away from each other and which extend parallel to the main plane, as well as two narrow sides 17 which face away from each other and which respectively extend perpendicularly to the main sides 15 in the heightwise direction H from the upper end region 16a to the lower end region 16b. At its main sides 15 the main body 13 respectively has a plurality of holding grooves 19 of identical configuration for receiving shelves 18. The holding grooves 19 extend parallel to each other and continuously from one narrow side 17 to the other perpendicularly to the heightwise direction H. Each holding groove 19 opens at each narrow side 17 into a respective insertion opening 170. A correspondingly profiled end of a shelf 18 can thus be inserted into the respective holding groove 19 from each narrow side 17, that is to say in each of the two assembly directions along the longitudinal direction L, and can be removed therefrom in the same way.

Figure 3:
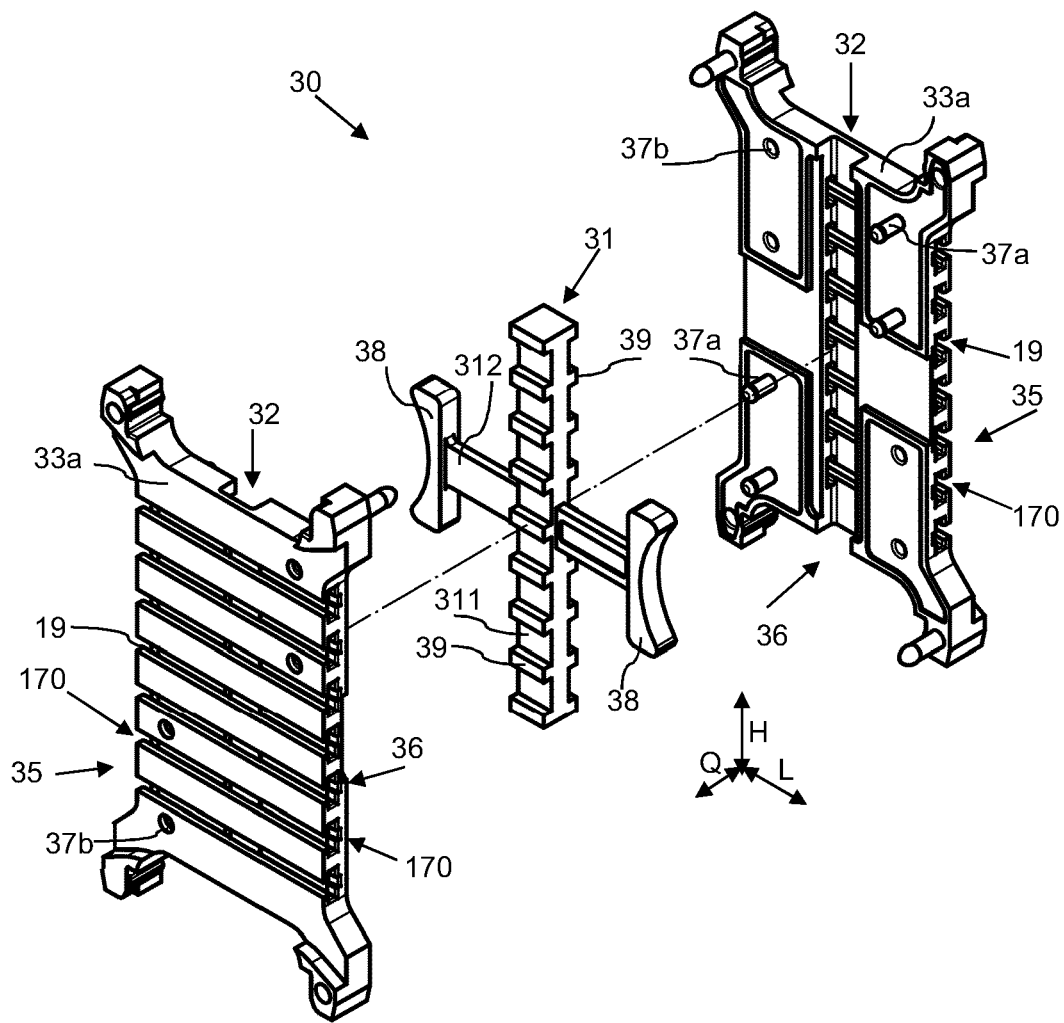
FIG. 3 shows an exploded view of a dividing bar according to a first embodiment.

FIG. 3 shows an exploded view of a first embodiment of a dividing bar 30. To secure the shelves 18 against unwanted displacement in the longitudinal direction L and unintentional release from the holding groove 19 the dividing bar 30 has a securing device having a locking slider 31.

The dividing bar 30 has a main body 33 which is of mirror-image symmetry in the main plane (see W-W in FIG. 2A) and is composed of two identical plate portions 33a. Each of the plate portions 33a is also symmetrical relative to the heightwise central plane perpendicular to the main plane. In addition each of the two structurally identical plate portions 33a is point-symmetrical relative to the central axis which extends as a broken line in FIG. 3 through the centres of symmetry of the two plate portions 33a.

The plate portion 33a has an outside 35 which forms one of the main sides 15 of the main body and the holding grooves 19, and an inside 36 which faces away from the outside 35 and has latching projections 37a and corresponding depressions 37b as connecting elements for latching to the second plate portion 33a to form a main body 33. In addition the inside 36 has a cross-shaped recess 32. When the two plate portions 33a are assembled to form a main body 33 the recesses 32 form a receiving means 34 for the locking slider 31 so that the locking slider 31 can be received centrally in the main body 33.

The locking slider 31 is mounted in the receiving means 34 of the dividing bar 30 displaceably in the heightwise direction H between a locking position and an unlocking position. In the embodiment shown in FIG. 3 the locking slider 31 is of a cross-shaped configuration, with a vertical bar 311 extending in the heightwise direction H and a horizontal bar 312 perpendicular to the vertical bar 311. The terms vertical and horizontal in the present case refer to the appropriate operative position of the locking slider 31 in a chain link 10, wherein vertically means along the heightwise direction H and horizontally means along the longitudinal direction L. The spatial orientation can be different depending on the respective position of the chain link or the energy guide chain.

At both ends of the horizontal bar 312 the locking slider 31 has a respective actuating projection 38 which is ergonomically shaped for manual displacement of the locking slider 31 between the unlocking and the locking positions. When the locking slider 31 is mounted between the two plate portions 33a of the main body 33 the two actuating projections respectively project at a narrow side 17 of the main body 33. For that purpose the recesses 32 are also cross-shaped and open at the narrow sides 17.

At both sides the vertical bar 311 has a row of lock elements 39 in the form of block-like projections, the number of which corresponds to the number of holding grooves 19 of the respective main side. The lock elements 19 project in a direction perpendicular to the main plane and are arranged at the same vertical grid spacing as the holding grooves 19. The locking slider 31 is produced in the form of a one-piece injection moulding with the lock elements 39.

When the locking slider 31 is in the locking position the lock elements 39 extend into the respective holding groove 19 and can be disposed approximately centrally there.

Figures 4A, 4B:
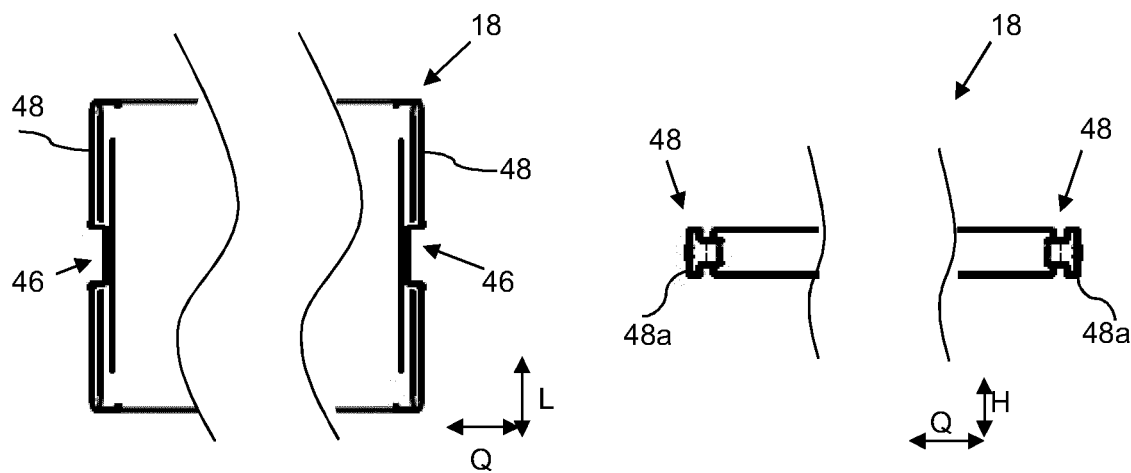
FIGS. 4A-4B show a shelf as a plan view (FIG. 4A) and a front view (FIG. 4B)

FIGS. 4A and 4B show a shelf 18 which is of a plate-like elongate configuration, with an extent in the transverse direction Q between the ends 48. In the end view in FIG. 4B the ends 48 each have a respective end projection 48a which extends in the longitudinal direction L and is complementary to the profile of the holding groove 19, in the illustrated example being T-shaped, for insertion of the end 48 into the holding groove 19. Another, for example dovetail-shaped profile of the holding groove 19 and the ends 48 of the shelves 18 is also possible. With that profile, the inserted shelf 18 is secured in the transverse direction Q perpendicularly to the main plane of the dividing bar 30.

For securing the shelf 18 in the longitudinal direction L, that is to say in the longitudinal direction of the holding groove 19, the ends of the shelf 18 each have a respective opening 46 for cooperating with a respective associated lock element 39. For insertion of an end 48 of a shelf 18 into the holding groove 19 the locking slider 31 has to be in the unlocking position. When an end 48 of the shelf 18 is received in the holding groove 19 the locking slider 31 can be displaced into its locking position in which the lock elements 39 respectively extend into a holding groove 19 and engage into the end opening 46 in the shelf 18. In that position the shelf 18 is fixed or secured in the longitudinal direction L to the dividing bar 30 and cannot be displaced or can be only slightly displaced along the holding groove 19.

FIGS. 5A and 5B (as well as FIGS. 6A and 6B each showing a portion on an enlarged scale) show in a side view along the longitudinal direction L the dividing bar 30 with the locking slider 31 in the unlocking position (FIGS. 5A, 6A) and in the locking position (FIGS. 5B, 6B). The holding grooves 19 are free in the unlocking position for insertion of the shelves 18 whereas in the locking position the holding grooves 19 are blocked by the associated lock elements 39.

FIG. 7A shows a side view along the longitudinal direction L illustrating the dividing bar 30 with a shelf 18 inserted into a holding groove 19 and the locking slider 31 in the locking position. FIG. 7B shows the section through the main plane of the shelf 18, that extends in the longitudinal direction L and the transverse direction Q. It can best be seen from joint consideration of FIGS. 7A and 7B that the shelf 18 on the one hand is secured by the T-shaped profile of the holding groove 19 to prevent displacement in the heightwise direction H and the transverse direction Q and on the other hand is secured by the positively locking connection between the opening 46 of the shelf 18 and an associated lock element 39 of the locking slider 31 to prevent displacement in the longitudinal direction L.

The locking slider 31 is of a point-symmetrical and mirror-image symmetrical configuration with three respective planes of symmetry. In that way it can secure the shelves 18 on both sides of the dividing bar 30 and can be unlocked in both directions along the vertical. That is particularly advantageous in the case of a chain link 10 in which both transverse bars 12 are in the form of opening bars. If required the locking slider 31 can thus be unlocked at each of the transverse bars 12.

The locking slider 31 can be moved out of the locking position in both directions along the heightwise direction H into the unlocking position. Besides displacement by the actuating projections 38 the locking action can also be achieved by pressing on the vertical bar 311. For that purpose the ends of the vertical bar 311 respectively form an end projection 82 which can project out of the main body 33. In the unlocking position of the locking slider 31 which is received in the main body 33, one of the end projections 82 issues from the main body 33, as shown in FIG. 8A, depending on the respective direction in which the locking slider 31 is displaced for unlocking along the heightwise direction H. By insertion of the end projection 82 upwardly in the illustrated case the locking slider 31 moves into the locking position. That can be effected in particular by closing an opened transverse bar 12. In that way it is possible to prevent locking bars 30 which are not locked remaining in a closed chain link 10 which is ready for operation, or automatic locking being caused.

FIGS. 9A to 11C show a further second embodiment of the dividing bar 90. A difference in relation to the locking bar 30 is that the main body 93 of the dividing bar 90 can be produced in one piece. The one-piece main body 93, as shown in FIG. 10A, is of a plate-like configuration and has two main sides 95 which face away from each other and which extend parallel to the main plane as well as two narrow sides 97 which face away from each other and which respectively extend perpendicularly to the main sides 95 in the heightwise direction H from the upper end region 16a to the lower end region 16b. The end regions 16a, 16b are equipped with latching feet 160 similarly to the above-described embodiment. At its main sides 95 the main body 93 has a respective plurality of identical holding grooves 19 for receiving shelves 18. The holding grooves 19 extend parallel to each other and continuously from one narrow side 97 to the other perpendicularly to the heightwise direction H. Each holding groove 19 opens at each narrow side 97 into one of two end insertion openings 170. A correspondingly profiled end of a shelf 18 can be inserted into the respective holding groove 19 from each narrow side 97, that is to say in each of the two assembly directions along the longitudinal direction L or the width of the dividing bar 90 and the shelf 18, and removed therefrom in the same way.

In FIGS. 9A to 11C the dividing bar 90 for securing the installed shelf 18 in the holding groove 19 has two locking sliders 91, a respective one for each main side 95 of the main body 93. Each of the locking sliders 91 is displaceable in a respective receiving means 94 along the longitudinal direction L. The receiving means 94 are in the form of depressions at the respective main side 95 of the main body 93. The main body 93 has a central symmetry so that the dividing bar 90 can also be inserted turned through 180° about the heightwise direction H, the longitudinal direction L or the transverse direction Q.

The two locking sliders 91 are identical here. As FIG. 10B shows the locking slider 91 is in the form of an elongated strip or bar member with a plurality of lock elements 99 in the form of projections. In an unlocking position of the locking slider 91 as shown in FIG. 9A or as a detail portion in FIG. 11A, the projections or the lock elements 99 are disposed between the holding grooves 19 with respect to the heightwise direction H so that the ends of the shelves 98 can be pushed into and moved out of the holding grooves 91.

The shelf 98 is of a plate-like configuration and at its ends for cooperation with the holding grooves 19 has a respective T-shaped projection 98a corresponding to the profile of the holding groove 19. As a further difference in relation to the first example the respective end of the shelf 98 here does not have two openings 96 which can respectively receive a lock element 99. Thus the shelf 98 can be of a mirror-image symmetrical configuration. The spacing of the respective opening 96 from the respective long narrow side of the shelf 98 in the longitudinal direction L corresponds to the spacing of the respective receiving means 94 from the closest narrow side of the main body 93. An embodiment without openings 96 on the shelf with end locking at both end edges is also conceivable.

Figure 11A:
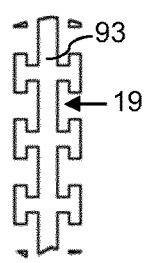
FIGS. 11A-11C show a detail view of the dividing bar of FIG. 9A (FIG. 11A), FIG. 9B (FIG. 11B) and a partial view of the dividing bar with an inserted shelf in a section along the main plane of the shelf (FIG. 11C)
Figure 11B:
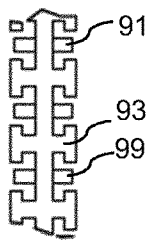
Figure 11C:
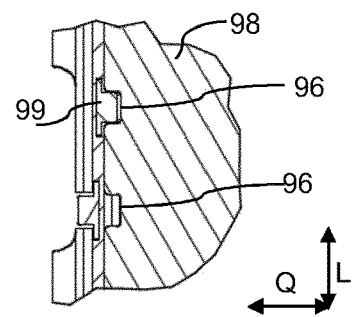

When the locking slider 91 is displaced or moved in the receiving means 94 into the locking position in the heightwise direction H, as shown in FIG. 9B and FIG. 11B (without shelf) or in FIG. 11C the lock elements 99 extend perpendicularly to the main side 95 into the holding grooves 19. In that position of the locking slider the shelf 98 is secured to prevent unwanted displacement along the holding groove 19.

FIGS. 12A-13B show a further embodiment of the dividing bar 120 which is produced in one piece, but here without the locking slider. As in the above-illustrated example the dividing bar 120 also has a symmetrical plate-like main body 123 with two main sides 125 and two narrow sides 127. The main sides 125 each have a respective row of profiled holding grooves 19 for receiving and positively lockingly holding an end 128a of a shelf 128. In this embodiment the holding grooves 19 also extend continuously from one narrow side 127 to the other and open at both sides, that is to say into a respective insertion opening 170, at each of the narrow sides 127. At their ends the shelves 128 have a projection which corresponds to the profile of the holding groove 19 and extends in the longitudinal direction L. Here, securing of the shelves 128 which are inserted into the holding grooves 19 to prevent displacement thereof along the holding groove 19 is effected by latching engagement of latching elements. For that purpose latching protrusions 124 are provided at ends 128a of the shelves 128, which latchingly engage into corresponding latching recesses 122 at the main sides 125 of the main body 123. An inverted configuration with latching protrusions on the main body is also conceivable.

All the above described components of the chain link 10 and in particular of the dividing bar 20, 30, 90, 120 are preferably produced in the form of plastic parts using an injection moulding method.

LIST OF REFERENCES

Figure 12A:
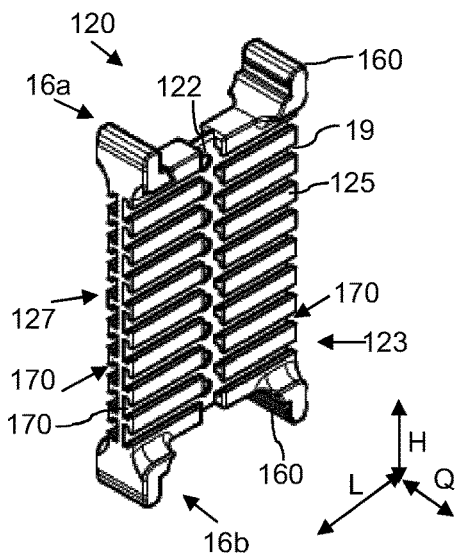
FIGS. 12A-12B show perspective views of a further third embodiment of the dividing bar (FIG. 12A) and the corresponding shelf (FIG. 12B)
Figure 12B:
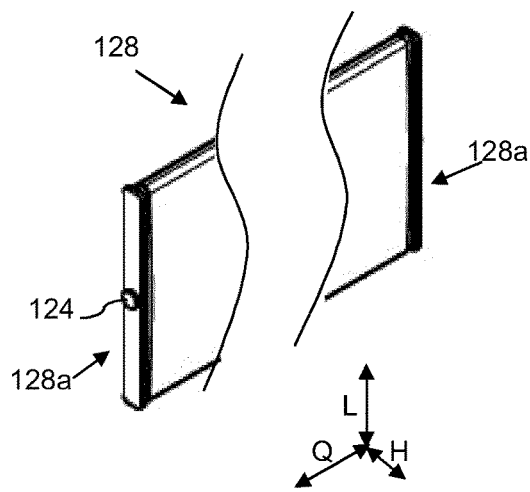
Figure 13A:
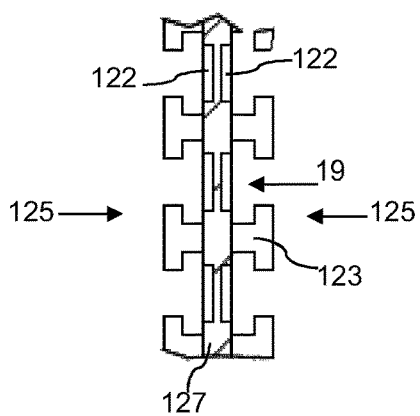
FIGS. 13A-13B show a detail view of the dividing bar of FIG. 12A (FIG. 13A) and a partial view of the dividing bar with an inserted shelf in a section along the main plane of the shelf (FIG. 13B).
Figure 13B:
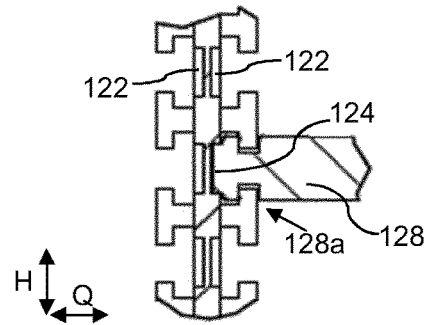

FIGS. 1, 2A, 2B:
  1 energy guide chain
  10 chain link
  11 side plate
  12 transverse bar
  13 main body of the dividing bar
  14 receiving space
  15 main side of the main body
  16a, 16b end regions of the dividing bar
  17 narrow side of the main body
  18 shelf
  19 holding groove
  20 dividing bar
  23 ends of the transverse bar
  110 horns of the side plates
  140 compartments of the receiving space
  160 latching foot of the dividing bar
  170 insertion opening of the holding groove
  H heightwise direction
  L longitudinal direction
  Q transverse direction FIGS. 3-8:
  15 main side of the main body
  17 narrow side of the main body
  18 shelf
  19 holding groove
  30 dividing bar
  31 locking slider
  32 recess
  33 main body of the dividing bar
  34 receiving means
  33a plate portion of the main body
  35 outside of the plate portion
  36 inside of the plate portion
  37a latching projections
  37b depressions
  38 actuating projection
  39 lock element
  46 opening on the shelf
  48 ends of the shelf
  48a projection at the end of the shelf
  82 end projection of the locking slider
  170 insertion opening of the holding groove
  311 vertical bar
  312 horizontal bar
  H heightwise direction
  L longitudinal direction
  Q transverse direction FIGS. 9-11:
  16a, 16b end region of the dividing bar
  18, 98 shelf
  19 holding groove
  90 dividing bar
  91 locking slider
  93 main body of the dividing bar
  94 receiving means
  95 main side of the main body
  96 opening on the shelf
  97 narrow side of the main body
  98a projection at the end of the shelf
  99 lock element
  160 latching foot
  170 insertion opening of the holding groove
  H heightwise direction
  L longitudinal direction
  Q transverse direction FIGS. 12-13:
  19 holding groove
  120 dividing bar
  122 latching recess
  123 main body
  124 latching protrusion on the shelf
  125 main side of the main body
  127 narrow side of the main body
  128 shelf 128a end of the shelf
170 insertion opening of the holding groove
H heightwise direction
L longitudinal direction
Q transverse direction

What is claimed is:

1. A dividing bar for internal division of a chain link of an energy guide chain, wherein the chain link has two side plates which are connected together by at least one transverse bar and define a receiving space for lines, the dividing bar including:
   a main body having an upper end region, a lower end region and two main sides and two opposite narrow sides which extend in a heightwise direction between the end regions, wherein at least one of the end regions is adapted for releasable fixing to a transverse bar; and
   wherein provided at both main sides is a respective number of holding grooves which extend substantially perpendicularly to the heightwise direction and into which a respective end of a shelf for internal division can be inserted and held, wherein:
      each holding groove is of a continuous configuration respectively from the one narrow side to the other and at each narrow side has an insertion opening so that a shelf can be respectively introduced into the respective holding groove and removed again therefrom from both sides through the corresponding insertion opening selectively in one of two opposite assembly directions; and
      the dividing bar has a securing device which secures the introduced shelf from unwanted displacement in both assembly directions and thus against unwanted release from the respective holding groove;
   wherein the securing device has a locking slider which is displaceable between a locking position and an unlocking position and has lock elements, wherein each lock element is associated with a holding groove and is displaceable into same for securing cooperation with the shelf;
   wherein the locking slider is displaceable in a receiving means in the main body in the heightwise direction.

2. The dividing bar according to claim 1, wherein the main body has two plate portions which respectively form a number of continuous holding grooves at an outside, form a recess for the locking slider at an inside and can be connected together by connecting elements.

3. The dividing bar according to claim 1, wherein the locking slider is arranged centrally in the main body.

4. The dividing bar according to claim 1, wherein the locking slider has at least one actuating projection which projects at a narrow side of the main body.

5. The dividing bar according to claim 4, wherein the locking slider has two opposite actuating projections which respectively project at one of the narrow sides of the main body.

6. The dividing bar according to claim 1, wherein the securing device has two locking sliders which are respectively displaceable in a receiving means in the main body in the heightwise direction between a locking position and an unlocking position and have lock elements, wherein each lock element is associated with a holding groove and is displaceable into same for securing cooperation with a shelf.

7. The dividing bar according to claim 6, wherein the main body has two receiving means which are perpendicularly displaced in relation to the heightwise direction for a respective locking slider.

8. The dividing bar according to claim 1, wherein the locking slider or sliders projects or project in the heightwise direction in the unlocking position with an end projection at the upper or lower end region of the main body.

9. The dividing bar according to claim 1, wherein the securing device has latching elements, wherein provided at each holding groove is at least one latching element, for latching cooperation with a corresponding latching element on a shelf.

10. A dividing bar for internal division of a chain link of an energy guide chain, wherein the chain link has two side plates which are connected together by at least one transverse bar and define a receiving space for lines, the dividing bar including:
    a main body having an upper end region, a lower end region and two main sides and two opposite narrow sides which extend in a heightwise direction between the end regions, wherein at least one of the end regions is adapted for releasable fixing to a transverse bar; and
    wherein provided at both main sides is a respective number of holding grooves which extend substantially perpendicularly to the heightwise direction and into which a respective end of a shelf for internal division can be inserted and held, wherein:
       each holding groove is of a continuous configuration respectively from the one narrow side to the other and at each narrow side has an insertion opening so that a shelf can be respectively introduced into the respective holding groove and removed again therefrom from both sides through the corresponding insertion opening selectively in one of two opposite assembly directions; and
       the dividing bar has a securing device which secures the introduced shelf from unwanted displacement in both assembly directions and thus against unwanted release from the respective holding groove, wherein:
    the holding grooves have a respective cross-section of T-shape at both main sides to cooperate with a corresponding projection of T-shaped cross-section at the end of a shelf for holding purposes; and/or
    the holding grooves continuously extend in mutually parallel relationship and respectively perpendicularly to the heightwise direction.

11. The dividing bar according to claim 10, wherein both end regions of the main body form a fixing device for releasable fixing by force-locking and/or positively locking relationship at an upper and a lower transverse bar.

12. The dividing bar according to claim 10, wherein:
    the main body is of a mirror-image symmetrical configuration with respect to its heightwise central plane; and/or
    the main body is of a mirror-image symmetrical configuration with respect to its main plane; or
    the main body is of an axially symmetrical configuration with respect to its heightwise central axis.

13. The dividing bar according to claim 10, wherein at least five holding grooves are respectively provided at each main side.

14. The dividing bar according to claim 10, wherein the two insertion openings of each holding groove respectively have opposite end inclined insertion portions or rounded insertion portions.

15. The dividing bar according to claim 10, wherein two respective holding grooves are provided facing away from each other at the same height at each main side.

16. A chain link for an energy guide chain, including two side plates and at least one transverse bar which connects the side plates together in a transverse direction to define a receiving space for lines, wherein for internal division in the receiving space two dividing bars are provided in parallel relationship with the side plates and at least one shelf respectively held at its ends by the dividing bars is provided in parallel relationship with the transverse bar, each of the two dividing bars including:
- a main body having an upper end region, a lower end region and two main sides and two opposite narrow sides which extend in a heightwise direction between the end regions, wherein at least one of the end regions is adapted for releasable fixing to a transverse bar; and
- wherein provided at both main sides is a respective number of holding grooves which extend in a longitudinal direction substantially perpendicularly to the heightwise direction and to the transverse direction and into which a respective end of a shelf for internal division can be inserted and held, wherein:
  - each holding groove is of a continuous configuration respectively from the one narrow side to the other and at each narrow side has an insertion opening so that a shelf can be respectively introduced into the respective holding groove and removed again therefrom from both sides through the corresponding insertion opening selectively in one of two opposite assembly directions; and
  - the dividing bar has a securing device which secures the introduced shelf from unwanted displacement in both assembly directions and thus against unwanted release from the respective holding groove;
- wherein the securing device has a locking slider which is displaceable between a locking position and an unlocking position and has lock elements, wherein each lock element is associated with a holding groove and is displaceable into same for securing cooperation with the shelf;
- wherein the locking slider has at least one actuating projection which projects at a narrow side of the main body.

17. The energy guide chain including a plurality of chain links wherein at least each second chain link is in the form of a chain link according to claim 16.

* * * * *